United States Patent
Southgate

[19]

[11] Patent Number: 5,880,725

[45] Date of Patent: *Mar. 9, 1999

[54] COMPUTER USER INTERFACE HAVING TILED AND OVERLAPPED WINDOW AREAS

[75] Inventor: Timothy James Southgate, San Carlos, Calif.

[73] Assignee: Altera Corporation, San Jose, Calif.

[*] Notice: The term of this patent shall not extend beyond the expiration date of Pat. No. 5,561,570.

[21] Appl. No.: 692,419

[22] Filed: Aug. 5, 1996

Related U.S. Application Data

[63] Continuation of Ser. No. 530,922, Sep. 20, 1995, Pat. No. 5,561,757, which is a continuation of Ser. No. 223,930, Apr. 6, 1994, Pat. No. 5,487,143.

[51] Int. Cl.[6] ................................................ G06F 15/00
[52] U.S. Cl. ........................ 345/340; 345/341; 345/342; 345/343
[58] Field of Search ..................................... 395/328, 329, 395/330, 331, 332, 333, 334, 336, 339, 340, 342, 343, 344, 345, 346, 350, 351; 345/340, 341, 342, 343

[56] References Cited

U.S. PATENT DOCUMENTS

| | | | |
|---|---|---|---|
| 5,079,695 | 1/1992 | Dysart et al. ............................. | 395/700 |
| 5,341,466 | 8/1994 | Perlin et al. ............................. | 395/139 |
| 5,371,847 | 12/1994 | Hargrove ................................. | 395/342 |
| 5,390,295 | 2/1995 | Bates et al. ............................. | 345/342 |
| 5,442,759 | 8/1995 | Chiang et al. ........................... | 395/375 |
| 5,579,469 | 11/1996 | Pike ....................................... | 395/340 |

OTHER PUBLICATIONS

Mastering Window 3.1, Robert Cowart, 1993, pp. xxx, 10, 11, 687, 249.

Microsoft Windows. Version 3.1 User's Guide. For the Mirosoft Windows Operating System. 1990–1992. PP. iii–650.

Chiverton, "Visual C++™ Features Better Editors, Faster Builds, and C++ Exceptions and Templates," *Microsoft Systems Journal*, Jul. 1994, pp. 37–39.

Rose et al., "The Macintosh User Interface Guidelines," *Inside Macintosh Volume I*, 1985, Chapter 2, pp. 23–70.

*Primary Examiner*—Ba Huynh
*Attorney, Agent, or Firm*—Beyer & Weaver, LLP

[57] ABSTRACT

A method and apparatus for managing the display of multiple windows in a computer user interface in an efficient manner. Two separate window areas are allocated in a display area. A first area is an overlapped window area where windows may overlap each other. A second area is a tiled window area where windows may not overlap each other. User interface controls are provided to allow the user to designate a displayed window as tiled or overlapped and the designated window is moved from area to area, accordingly. Windows in either area may be resized and repositioned, although with some restrictions in the tiled area. The computer system automatically adjusts window and area sizes within predefined limits.

37 Claims, 14 Drawing Sheets

COMPUTER USER INTERFACE HAVING TILED AND OVERLAPPED WINDOW AREAS

This is a Continuation of application Ser. No. 08/530,922, filed Sep. 20, 1995, issued as U.S. Pat. No. 5,561,757, which is a continuation of application Ser. No. 08/223,930, which was filed Apr. 6, 1994, U.S. Pat. No. 5,487,1243.

BACKGROUND OF THE INVENTION

This invention relates generally to computer user interfaces and specifically to a computer user interface that has a first area for displaying windows in an overlapped arrangement and a second area for displaying windows in a tiled arrangement.

A popular way to present information to users of today's computer systems is via a graphical user interface (GUI). GUIs are usually part of the environment provided by the operating system of a computer. However, application programs can also create their own GUI by displaying objects on the screen independently of utilities provided by the operating system. A combination of these two approaches can also be used.

While GUIs may vary from operating system to operating system and from application program to application program, there are basic components in contemporary GUIs that find themselves in virtually all GUIs. Most popular GUIs use a "mouse and windowing" environment where the user interacts with the computer by using a pointer displayed on the screen and manipulated by a hand held "mouse" input device. Information is displayed to the user within windows that are rectangular areas on the screen containing text or graphics related to the operation of an application program or an operating system. Other characteristic features common in GUIs are icons, menus, etc.

A "window" is the central way to provide information to, and receive information from, a user. There are usually one or more active windows on the display screen at any given time. Each window conveys information about an application program or other process executing in the computer. There may be multiple windows for a single application program or process where each window is used to convey different types of information. There can be multiple views of the same information such as two text windows showing overlapping portions of the same document. Typically, the computer system displays information within the window and accepts information from the user, sometimes in the form of special windows called "dialog boxes". The user often has some control over the existence, placement and size of a window and sometimes can even control the amount and type of information conveyed by the window. For a more detailed discussion of the use of windows in typical computer systems, see, e.g., "Microsoft Windows Version 3.1 User's Guide," by Microsoft, Inc.

Windows are manipulated both by the computer and by the human user. Windows can be opened and closed, causing them to appear or disappear, respectively, on the display screen. Usually windows can be resized by the user so that their height and width may be adjusted. The information within the window can be scrolled if the window is able to show only a portion of the total information. Windows can be moved around on the screen so that they may be positioned virtually anywhere and they may be overlapped by positioning a portion of one window over another. When windows overlap the "top" window is the only window that is completely visible since the bottom window is partially obscured by any window or windows on top of it.

As application programs become larger and more complex, the likelihood of windows overlapping on the display screen increases. Typically, an application program has a single main, or "parent," window. Within the parent window multiple "child" windows are displayed. During the execution of an application program the child windows are manipulated by both the computer and user and inevitably overlap. The presence of multiple overlapping child windows on a screen requires that that user constantly shuffle through the windows in order to find the correct window with the information that is of interest at the moment. This is similar to a person rummaging around on a cluttered desk trying to find the proper document. A similar problem exists with parent windows, themselves, in a multitasking environment when more than one application program is executing. In this case the computer may cause one application program's parent window to obscure the child or parent windows of another application program.

Current GUIs, such as WINDOWS by Microsoft, Inc., and the Macintosh operating system by Apple Computer, Inc., are not sufficiently helpful in managing multiple overlapping windows. In these operating systems there is no guarantee that critical information about a window will always be visible.

For example, the title name in the "title bar" of a window might be obscured along with the contents of the window. The GUI provides commands for arranging windows so that at least a small portion of each window is visible. This allows the user to grab and move the window or to bring the window to the top so it is completely visible. However, the small portion of the window that is visible is often not enough to identify the window so the user must "click" on each window in turn until finding the proper window. This is cumbersome when there are many windows on the screen and only tiny portions of several windows' corners are exposed.

Another problem arises in that the user often wishes to view the information in a window continuously during the operation of a program. However, the computer may decide that another window is important if it is being updated, for example. The computer attempts to bring the updated window to the front of a pile of overlapping windows. In traditional GUIs the user can get around this problem by resizing and moving windows so that there is enough room to place the window of interest off to the side in an area where it won't be overlapped. However, this requires a lot of manipulation by the user that must be repeated every time the user wants to insure that a different window isn't obscured. Also, there is no guarantee that the computer, under the direction of the operating system or an application program, won't decide to overlay additional windows over the user's window of interest. When multiple windows are being updated quickly it often becomes impossible for the user to see all of the information desired due to obscured windows.

The user may also designate a window to always be "on top" of other windows to solve the problem of being able to continuously view a window of interest. This has the drawback that an updated window containing important information can be obscured by the window given "top" priority by the user. Another drawback is that only one window can be guaranteed to be on top at any one time.

Application programs and operating systems attempt to alleviate these problems somewhat by using a fixed "status line" at the bottom of the parent window. However, the status line is very restrictive in that only a small amount of text can be displayed and the user has no control over the type of information that is designated for the status line.

Early operating systems used "tiled" or "cascaded" window arrangements to eliminate the problem of overlapping windows. When windows are arranged in a tiled manner, each window is adjacent to other windows that may exist on the screen. That is, the window borders abut much like tiles on a floor. An example of an early operating system that used this approach is Microsoft Windows Version 1.0 by Microsoft, Inc. However, the tiled approach has generally been given up in favor of the overlapped window arrangement because the tiled arrangement was too limited in the number of windows that could be displayed and in the user's ability to resize and reposition windows.

The cascaded arrangement overlaps the windows but insures that at least a small portion of each window is available for manipulation. As mentioned above, this is often not enough to allow the user to identify each window or to perform all of the functions desired in a window of interest.

From the above discussion it is apparent that problems exist in traditional GUIs when multiple windows are displayed in that a window of interest may be obscured. This is especially true when the computer system continually opens and displays new windows of various sizes and importance in different positions on the display screen during the execution of an application program.

SUMMARY OF THE INVENTION

The present invention solves the problem of window management by providing two separate areas on the display screen. The first area is the traditional overlapped window area where windows are handled as with traditional GUIs. The second area is the "tiled" area where windows are not allowed to overlap. The tiled area is an area where windows selected by a human user or the computer are placed without the possibility of their being overlapped or obscured. The invention provides an efficient interface that intelligently manages the placement of windows in the tiled area. The present invention also provides for resizing of both overlapped and tiled areas by automatically resizing the windows in each area, as needed.

The invention includes a method for displaying multiple windows during the execution of an application program in a computer. The computer includes a processor and a display for displaying windows and other information. When the application program is executed windows are generated which are displayed on the screen by the processor. The steps in the method include allocating a first area of the display as the overlapping window area; allocating a second area of display as the tiled window area; designating each window as overlapped or tiled; displaying overlapped windows in the overlapping window area such that two or more windows overlap; and displaying tiled windows in the tiled window area such that the windows are tiled.

DESCRIPTION OF THE PREFERRED EMBODIMENT

Figure 1:
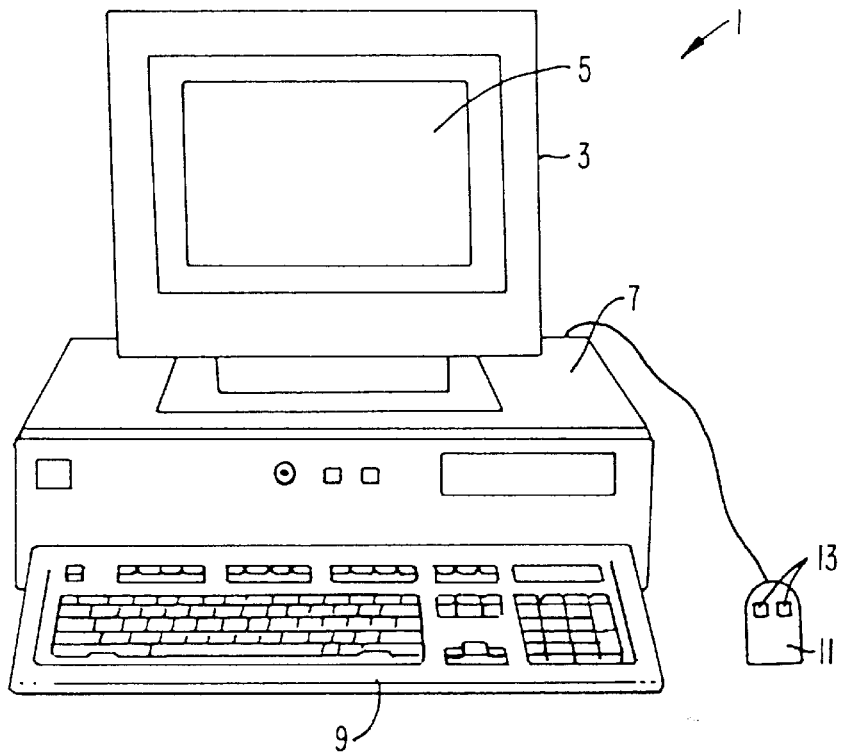
FIG. 1 is an illustration of a computer system suitable for use with the present invention.

FIG. 1 is an illustration of a computer system suitable for use with the present invention. FIG. 1 depicts but one example of many possible computer types or configurations capable of being used with the present invention. FIG. 1 shows computer system 1 including display device 3, display screen 5, cabinet 7, keyboard 9 and mouse 11. Mouse 11 and keyboard 9 are "user input devices." Other examples of user input devices are a touch screen, light pen, track ball, data glove, etc.

Mouse 11 may have one or more buttons such as buttons 13 shown in FIG. 1. Cabinet 7 houses familiar computer components such as disk drives, a processor, storage means, etc. As used in this specification "storage means" includes any storage device used in connection with a computer system such as disk drives, magnetic tape, solid state memory, bubble memory, etc. Cabinet 7 may include additional hardware such as input/output (I/O) interface cards for connecting computer system 1 to external devices such as an optical character reader, external storage devices, other computers or additional devices.

Figure 2:
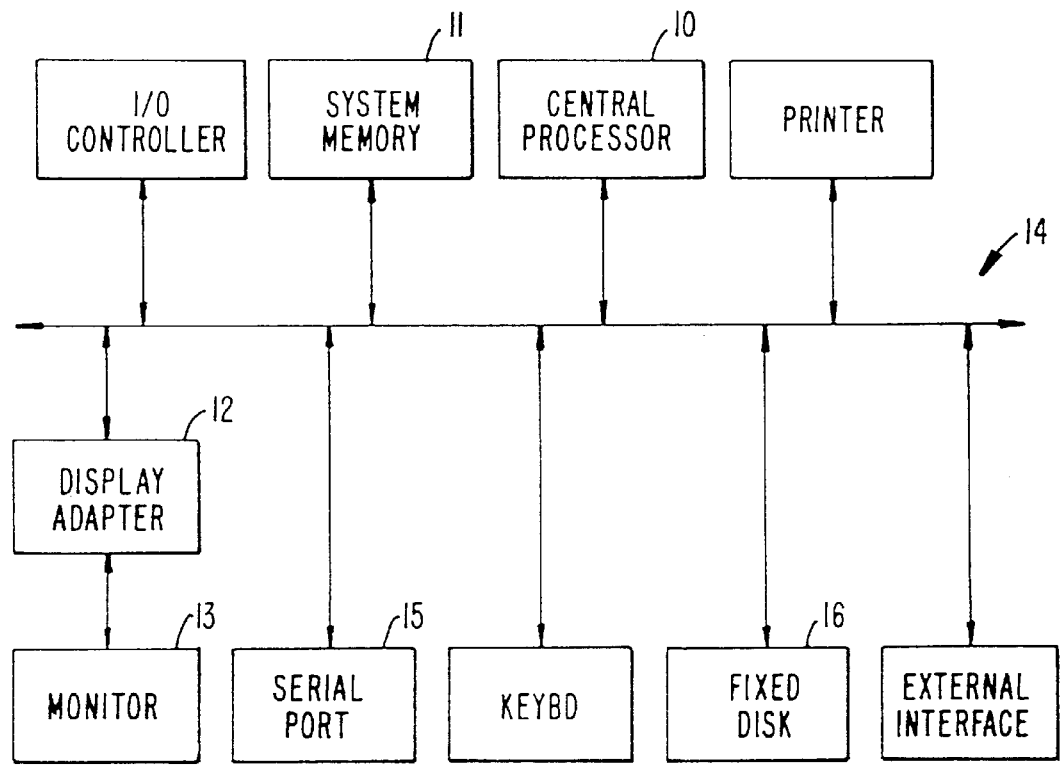
FIG. 2 is an illustration of basic subsystems in the computer system of FIG. 1.

FIG. 2 is an illustration of basic subsystems in computer system 1 of FIG. 1. In FIG. 2, subsystems are represented by blocks such as central processor 10, system memory 11, display adaptor 12, monitor 13, etc. The subsystems are interconnected via a system bus 14. Additional subsystems such as a printer, keyboard, fixed disk and others are shown.

Peripherals and input/output (I/O) devices can be connected to the computer system by, for example serial port 15. For example, serial port 15 can be used to connect the computer system to a modem or mouse input device. The interconnection via system bus 14 allows central processor 10 to communicate with each subsystem and to control the execution of instructions from system memory 11 or fixed disk 16, and the exchange of information between subsystems. Other arrangements of subsystems and interconnections are possible.

The present invention provides an efficient way to manage windows where multiple windows are used and displayed. This applies when the computer system is executing instructions from an operating system or application program. The invention is discussed below primarily where an application program, rather than an operating system, executes and displays multiple windows. However, it will be apparent that the window management system of the present invention can be readily applied to operating system functions where the operating system is controlling the display of multiple windows.

Figure 3:
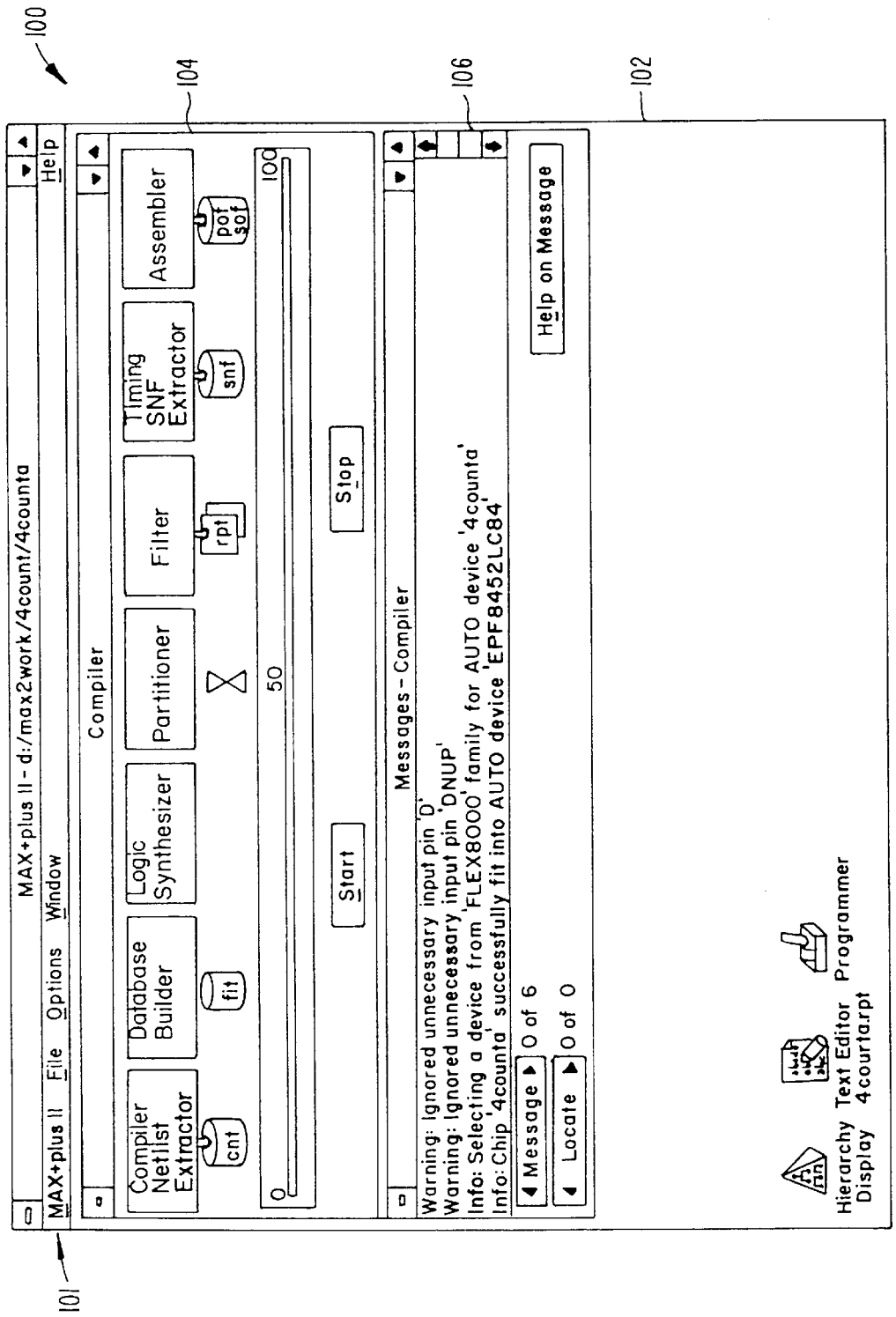
FIG. 3 shows a parent window of an application program.

FIG. 3 shows parent window 100 as it would appear on display screen 5 of the computer system 1 in FIG. 1. Parent window 100 shows parent window 102 generated in response to the execution of an application program called "MAX+plus II," manufactured by Altera Corp. This application program is typical of application programs that display multiple windows. Parent window 102 includes two "child" windows 104 and 106.

In normal operation, an application program such as MAX+plus II displays a single parent window on the screen such as parent window 102 and, during the course of execution, displays multiple child windows such as 104 and 106 in an overlapped manner. In FIG. 3, child windows 104 and 106 are not overlapped but are shown one above the other. This is an initial view that can be set up by the MAX+plus II software or at the user's discretion. In the simple situation where only two windows of limited size are on the screen there is sufficient space so that they may both be viewed easily in their entirety. However, the MAX+plus II program is a large and complex program for doing computer aided design (CAD) of electronic circuits. During the course of executing MAX+plus II the computer system displays many new windows that, of necessity, overlap each other.

Figure 4:
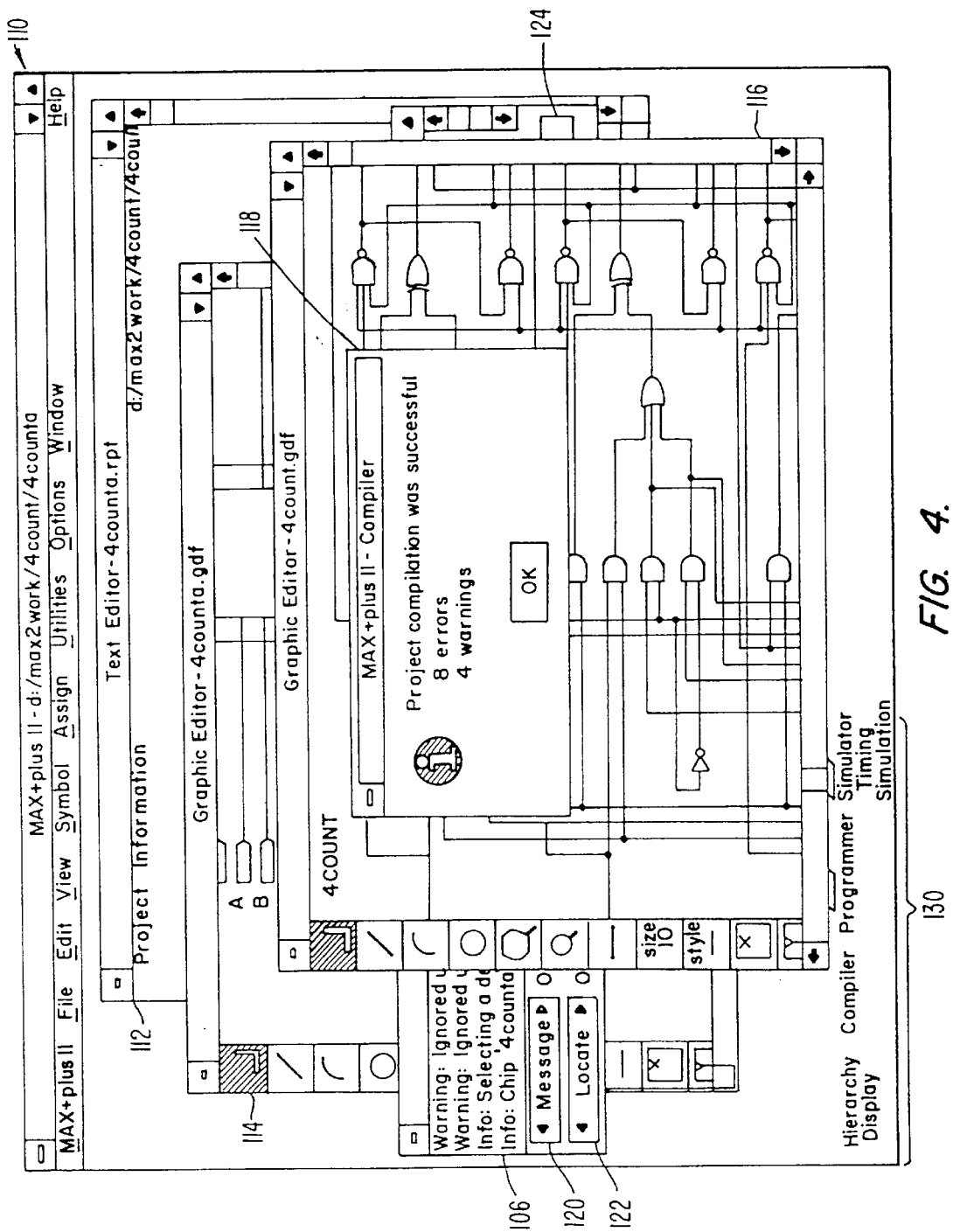
FIG. 4 shows a second display screen of the application program.

FIG. 4 shows a second display screen of the MAX+plus II program. In FIG. 4 display screen 110 is now shown with five child windows 112, 114, 106, 118 and 116. Child window 106 of FIG. 4 is the same child window as child window 106 of FIG. 3. Note that child window 104 of FIG. 3 has been "iconized", that is, it is displayed as an icon in FIG. 4.

In FIG. 4, four of the five child windows are obscured. Child windows such as 112, 114 and 116 need to be large and rectangular in order to effectively display the detailed circuit diagrams and/or text information within these windows. A child window such as child window 106 is a scrolling status window where lines of text are displayed during the course of application program execution in order to give warning messages and status updates on the performance of a task. In this case, the task is the compilation of a circuit design description in order to determine errors, optimize the circuit, etc.

A status window such as child window 106 has a preferred size of a long width as compared to a relatively short height. This is because the status window displays messages that are typically one line per message. This is a convenient way for the user to view status messages since each line corresponds to a different message and, once a message has been read by the user, it is usually no longer of importance. For this reason, the status window only needs to display a few most recent messages. The status window has additional controls in the form of buttons such as buttons 120, 122 and 124. Note that in FIG. 4, the status window is largely obscured by windows that have been overlaid, or overlapped, on top of it. The overlapping of windows onto the status window renders the status window almost useless. Not only is most of the text information obscured, but button 124 is mostly hidden from view so that, although the button is still accessible by the small right-most portion, the identification of the button as providing "Help on Message" has been lost. In fact, the only windows that are sufficiently visible to convey useful information are child window 118 and, perhaps, child window 116. Note also that some of the icons toward the bottom of the screen at 130 are obscured. In particular, the right-most icons have lost their visual cues since the graphics intended to convey what the icons represent are mostly hidden.

Figure 5:
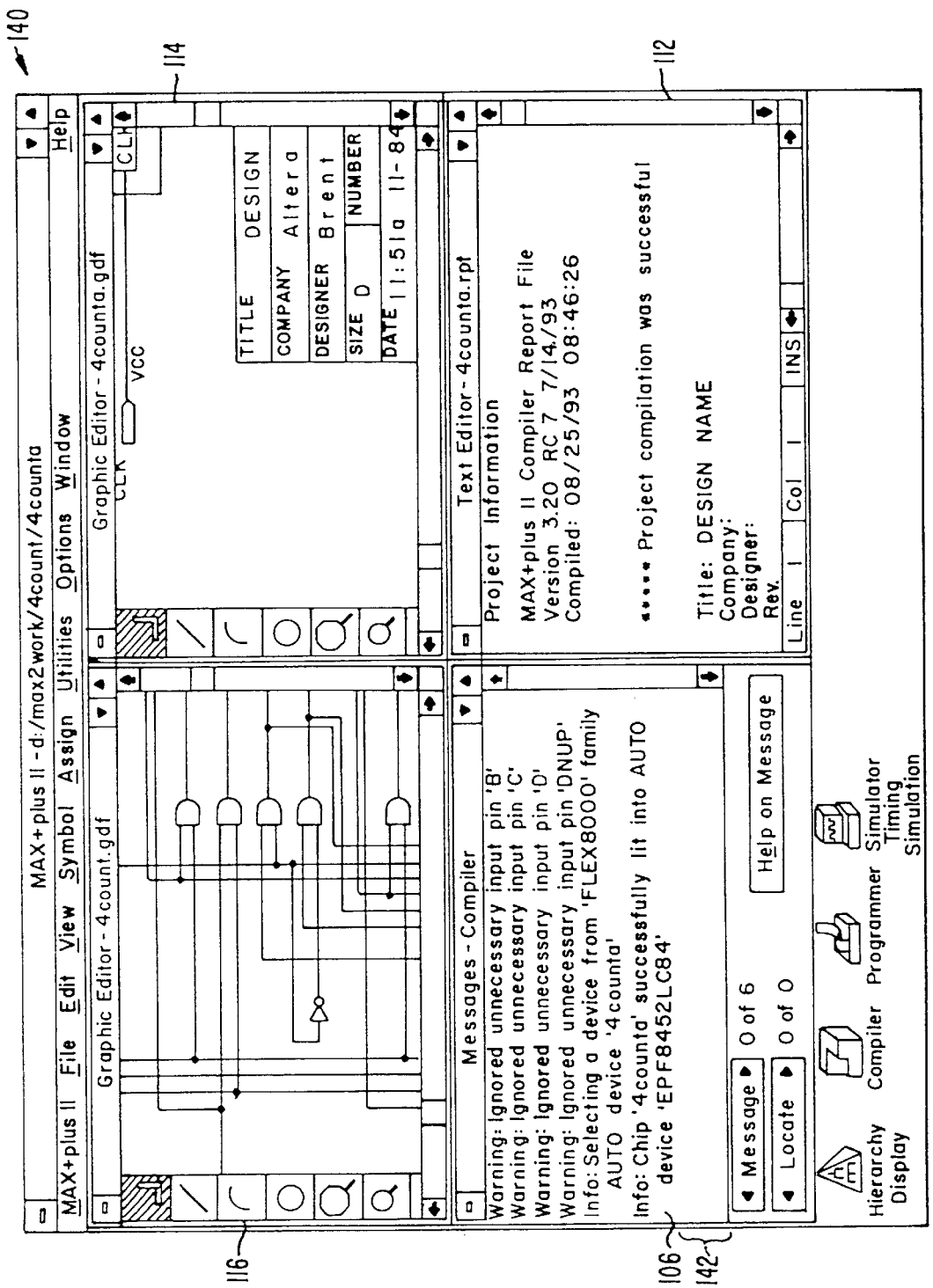
FIG. 5 shows a second view of some of the windows in FIG. 4.

FIG. 5 shows a second view of some of the windows of FIG. 4 in parent window 140. FIG. 5 shows child windows 116, 114, 106 and 112 in a so-called "tiled" arrangement. In FIG. 5, each child window's border touches the adjacent child window's border. Although the tiled arrangement of FIG. 5 provides a solution to the problem of overlapping windows obscuring desired information, this is not a desirable solution.

One problem with the tiled arrangement of FIG. 5 is that circuit schematic windows 116 and 114 are not large enough to be useful. Another problem is that status window 106 does not have the proper dimensions as before. Note that the last two lines of status window 106 can no longer fit on a single line and so must be put on two lines. Also, while status window 106 is too small in the horizontal direction, it is now too large in the vertical direction. There is extra space at 142 that is not being used in status window 106.

The tiled arrangement of FIG. 5 is further restrictive in that no additional windows may be displayed without drastically reducing the size of the existing windows. Also, some windows, such as window 112, may only be marginally useful and would be better left with less space allocation on parent window 140.

Figure 6:
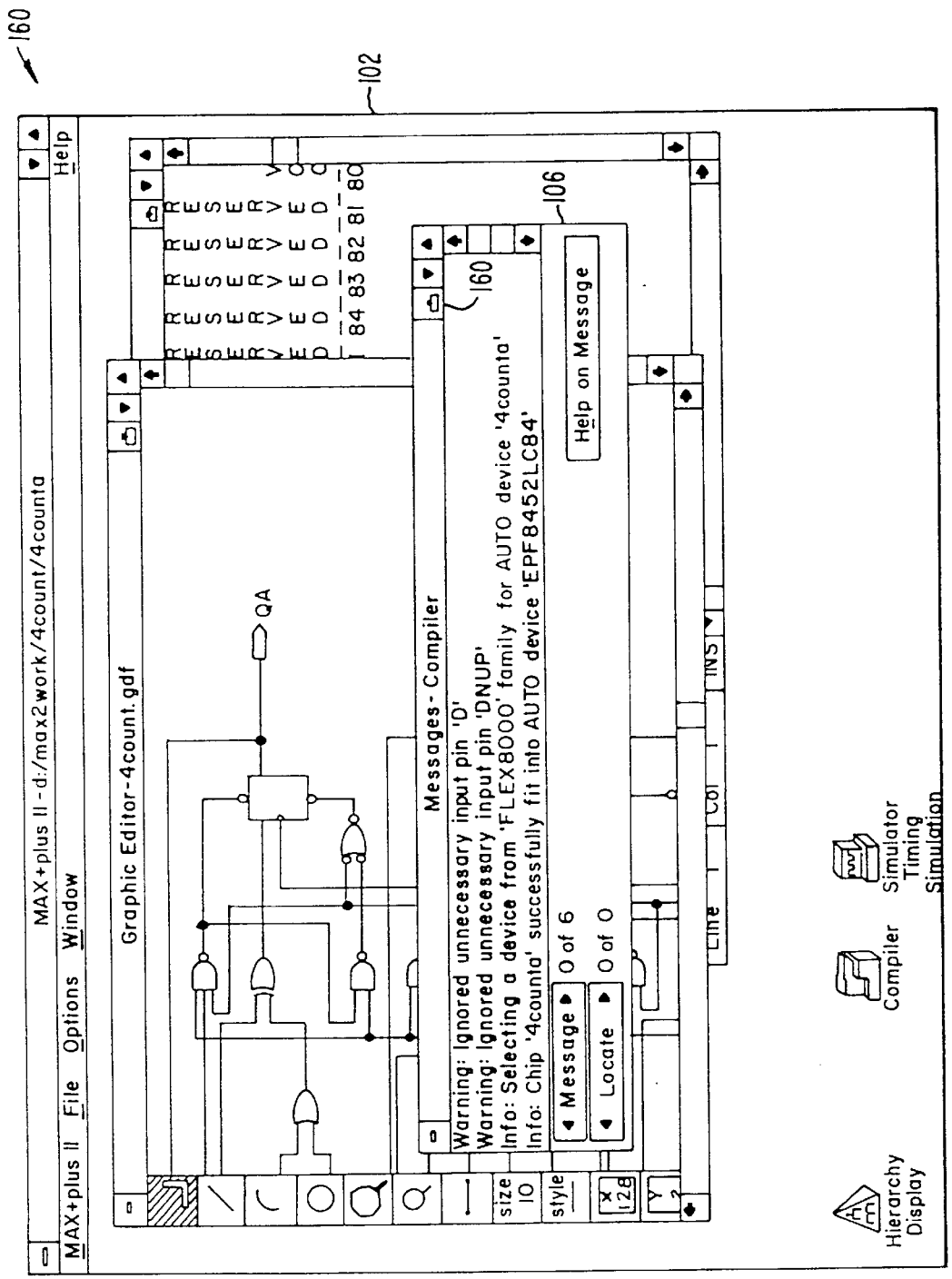
FIG. 6 shows an example of a parent window having three windows that include a special control feature of the present invention.

FIG. 6 shows an example of a parent window, parent window 160, having three windows that include a special control feature of the present invention. In FIG. 6, each child window is equipped with a tile button such as tile button 160 for window 106. In a preferred embodiment, the default display is the overlapped display of the prior art as shown in FIG. 6. However, by activating the tile button for a child window, the parent window is divided into separate areas having different properties for displaying windows.

FIG. 6 shows parent window 160 prior to any of the tile buttons of the child windows being activated. Prior to activating a tile button, the entire area in parent window 102 is used as an overlapping window area.

Figure 7:
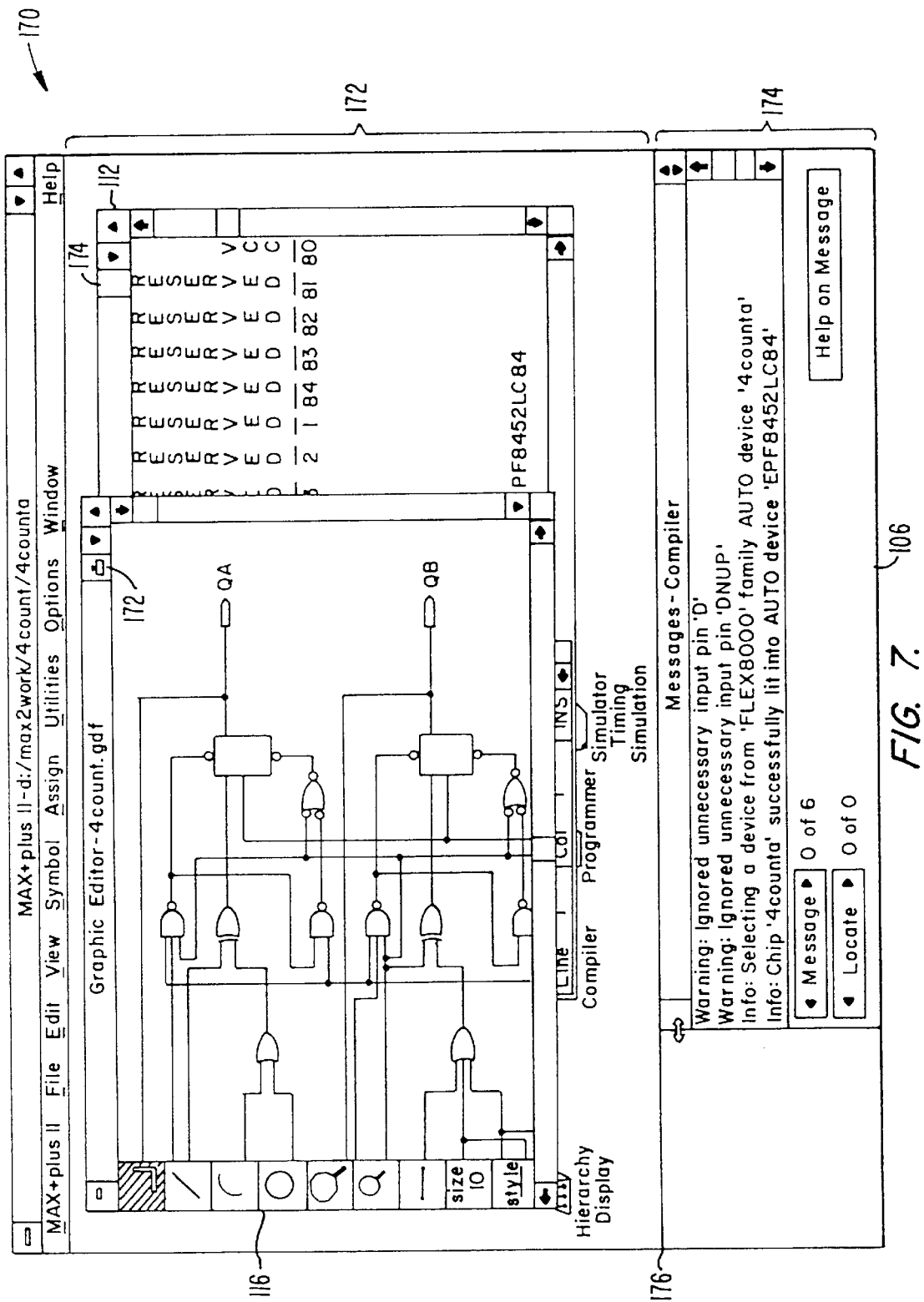
FIG. 7 shows a parent window as it appears immediately after a tile button is activated.

FIG. 7 shows parent window 160 of FIG. 6 as it appears immediately after tile button 160 in status window 106 of FIG. 6 is activated. In FIG. 7, display screen 170 is now separated into two areas. These areas are an overlapped window area 172 and a tiled area 174. A horizontal boundary 176 is used to separate the two areas which each run the width of the application window. Since no tiled area existed before the activation of tile button 160, an initial tiled area is created with a height that is the same height as child window 106. If one of the other windows 116 or 112 had, instead, been selected for placement in the tiled area by using buttons 172 or 174, respectively, an attempt would be made to create a tiled area at the bottom of the screen that was as high as the selected window. In a preferred embodiment, the tiled area is allowed to automatically grow to one half of the height of the parent window but can be manually extended past this initial limit. Details on how the window management system of the present invention handles the allocation of area and window sizes are discussed below.

Figure 8:
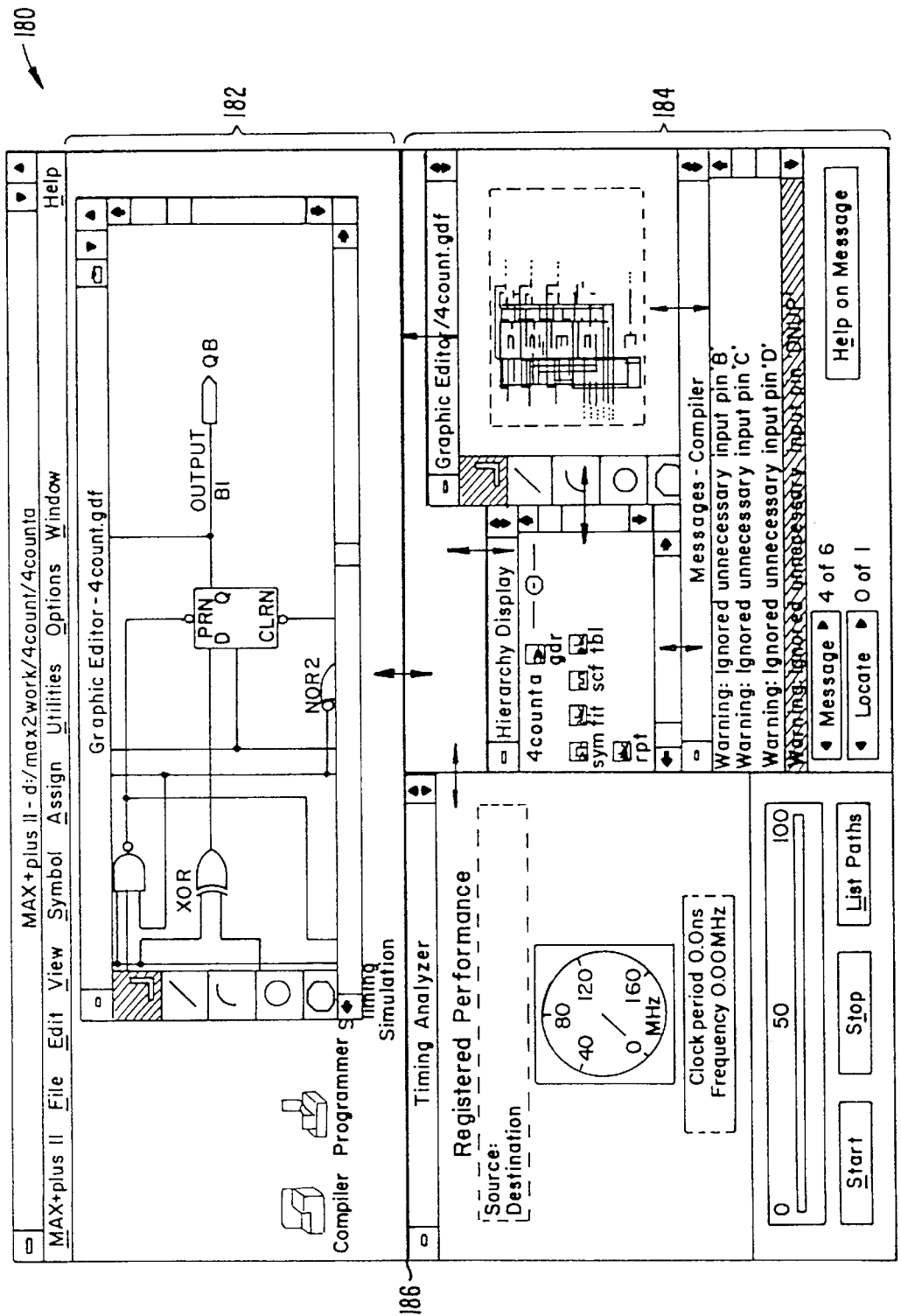
FIG. 8 shows a parent window divided into an overlapped area and a tiled area containing an arrangement of child windows.

FIG. 8 shows parent window 180 where the parent window of the MAX+plus II application program is divided into overlapped area 182 and tiled area 184 and the tiled area 184 contains a more complex arrangement of child windows. The double-headed arrows in FIG. 8 show the directions that child window borders may be dragged in order to change the sizes of the child window and adjacent child windows. In addition, area boundary 186 may also be moved in a vertical direction as shown by the double-headed arrow. The way that the present invention provides for shrinking and enlarging windows and overlapped and tiled areas will next be discussed in connection with flowcharts that illustrate methods of the present invention.

Figure 9:
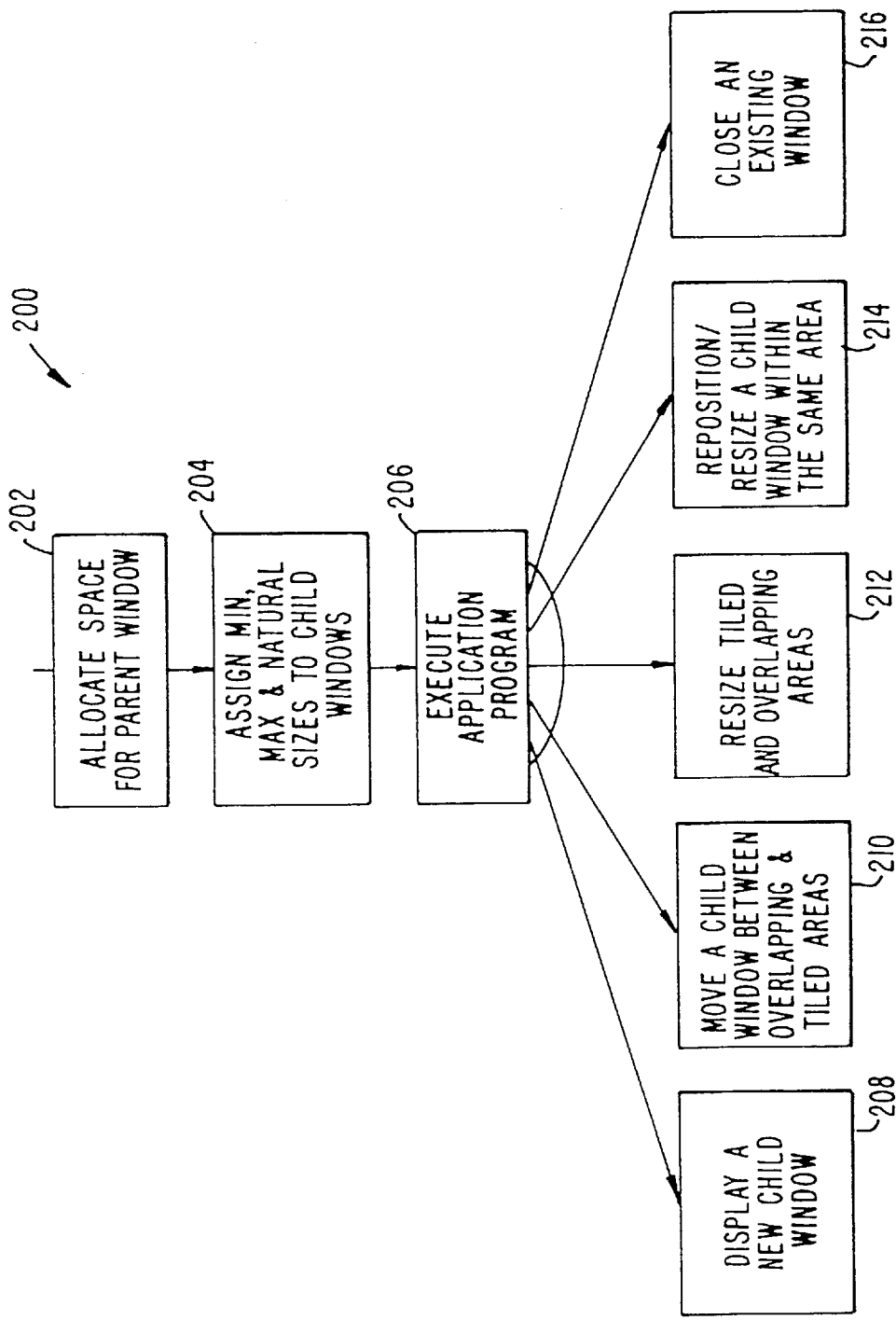
FIG. 9 shows a top level diagram illustrating some of the basic steps involved in a window managing method of the present invention.

FIG. 9 shows top level diagram 200 that illustrates some of the basic steps involved in a window managing method of the present invention. Prior to executing step 202, it is assumed that an application program has been selected for execution by either a user or the operating system. At step 202 space is allocated to the application program's parent window. This step is usually performed by the operating system.

At step 204 minimum, maximum and natural sizes are assigned to each child window that could appear during the execution of the application program. This can be predetermined within the application program itself as defined by the human programmer of the application program, or can be assigned by the operating system as the child windows are opened. In the latter method, the operating system assigns default values to most windows. Another possibility is that the operating system would make an educated guess as to the minimum, maximum and natural sizes for the window based on the type of window and the information it displays, e.g., text, graphics, etc.

Each window has a minimum, maximum and natural size for each of the window's two dimensions, height (vertical dimension) and width (horizontal dimension). The minimum dimensions determine the smallest size for the dimension that the window can have and still be functional or be useful to the user. The minimum size for a window can be chosen according to the smallest size that permits the window to accommodate the minimum number of control buttons and still remain functional. Or the minimum size can be limited because of the type of information that the window displays, e.g., graphics, so that the window will not shrink beyond being able to display recognizable data to the user.

The maximum dimensions, likewise, determine the maximum dimensions allowed for the height and width of each window. The maximum dimensions are limits on the growth of a window because making a window larger than the maximum size in a certain dimension would not gain anything. For example, a window that only displays text lines of up to 40 characters in width would have a maximum width that would be just large enough to accommodate the 40 characters of text. Widening the window beyond this would just be a waste of space within the window.

The natural dimensions for a window are the preferred sizes for the window's height and width. The natural dimensions are between the maximum and minimum sizes and are the preferred dimensions for the window. The natural dimensions also determine the preferred aspect ratio as the ratio of width to height. The preferred embodiment always attempts to display a window in the preferred aspect ratio or as close to it as possible.

Returning to FIG. 9, at step 206, the application program is executed. The execution of the application program invokes one or more of steps 208–216 for displaying a new child window 208, moving a child window between overlapped and tiled areas 210, resizing tiled and overlapped areas 212, repositioning/resizing a child window within the same area 214, and closing an existing window 216. In general, the steps shown in top level diagram 200 may be executed at different times and performed by different processes within the computer system. These steps can be performed by the operating system, the application program or a combination of both. Further, steps may be repeated, especially steps 208–216 which are repeated many times during the execution of an application program.

In the discussion below, certain steps critical to the present invention, such as moving a child window from the overlapped area to the tiled area, enlarging a child window within the tiled area and changing the size of the tiled area, are discussed in detail.

Moving a Child Window from the Overlapped Area to the Tiled Area

A user may move a child window from the overlapped area to the tiled area in three different ways. A first way is for the user to "click and drag" a window from the overlapped area to the tiled area and then "drop" the window in an open space in the tiled area. This assumes that a tiled area exists and that there is a space, or slot, in the tiled area for the window to fit. A second way is for the user to click on the tile button within the window to be moved as discussed above in FIG. 6 where tile button 160 is shown within status window 106. A third way is for the user to access a menu from the main menu bar of the parent window, such as main menu bar 101 shown in FIG. 3.

In a preferred embodiment, the menu selection for placing a child window into the tiled area is a "Penalize" command. Once a window is selected, the selected window is placed into the tiled area (whimsically referred to as the "Hog Pen") by choosing the "Penalize" command from the menu. The product incorporating these features is anticipated to be "MAX+plus II Version 5.2" by Altera, Corp.

Next, the flowchart of FIG. 10 will be discussed to illustrate basic steps in a method of the present invention. In general, the flowcharts in this specification illustrate one or more software routines executing in a computer system such as computer system 1 of FIG. 1. The routines may be implemented by any means known in the art. For example, any number of computer programming languages, such as "C", Pascal, FORTRAN, assembly language, etc., may be used. Further, various programming approaches such as procedural, object-oriented or artificial intelligence techniques may be employed.

The steps of the flowcharts may be implemented by one or more software routines, processes, subroutines, modules, etc. It will be apparent that each flowchart is illustrative of merely the broad logical flow of the method of the present invention and that steps may be added to, or taken away from, the flowcharts without departing from the scope of the invention. Further, the order of execution of steps in the flowcharts may change according to different implementations such as interrupt-driven, polled, etc., event handling. A multiprocessing or multitasking environment could allow steps to be executed concurrently. For ease of discussion the implementation of each flowchart is referred to as if the flowchart were implemented in a single "routine".

Figure 10:
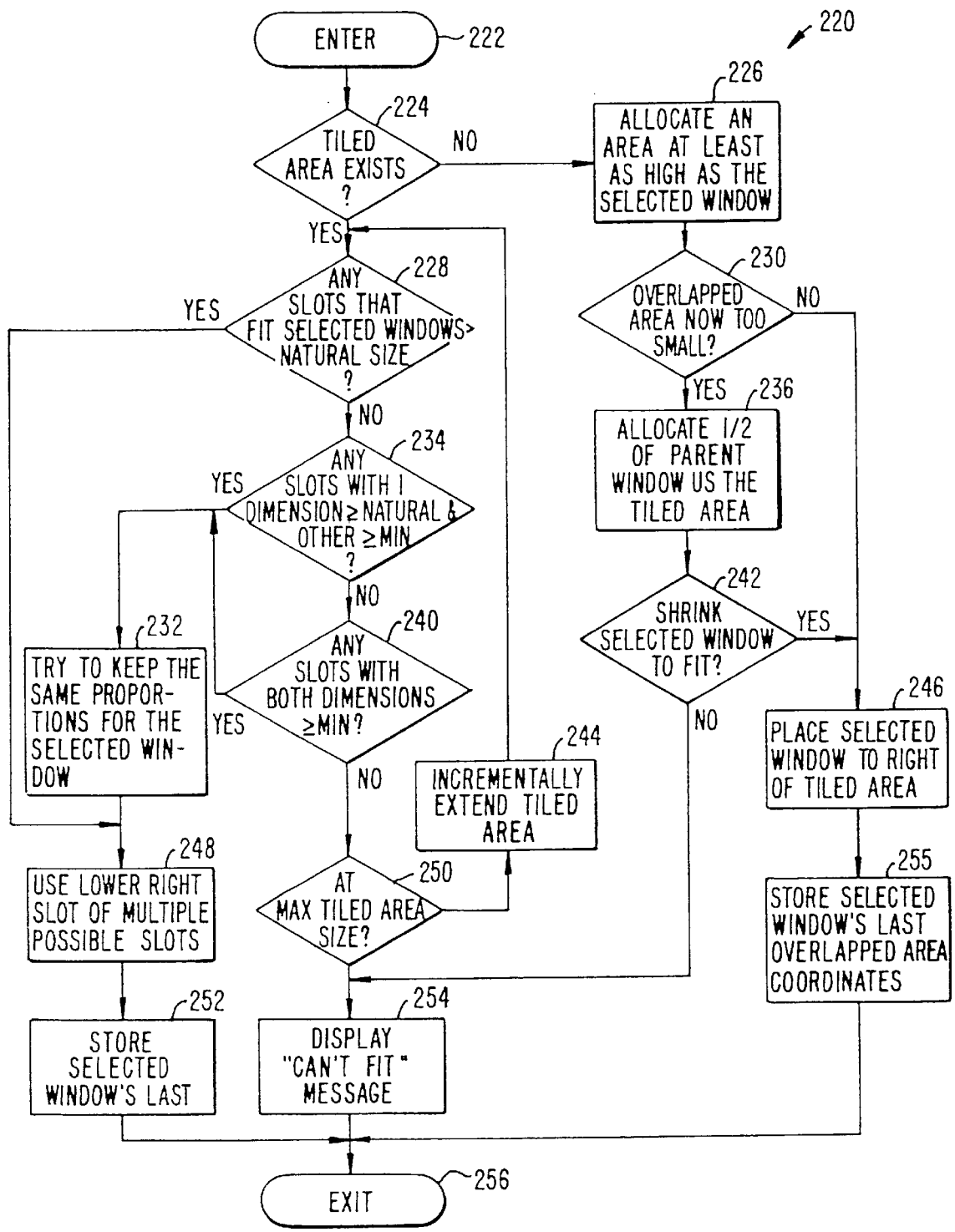
FIG. 10 shows a flowchart of a routine for placing a child window into a tiled area.

FIG. 10 shows flowchart 220 that describes a routine for placing a child window into a tiled area. Steps 222–256 of flowchart 220 are performed by the computer system. Routine 220 can be invoked when the user has indicated that a window is to be moved to the tiled area by one of the ways described above. Routine 220, or another routine similar to it, can also be invoked when the application program or operating system needs to place a window into the tiled area automatically.

Routine 220 is entered at step 222 after a child window has been selected to be moved. The selected child window is referred to as the "selected window." The coordinates, and thus the dimensions, for the parent window and any existing overlapped or tiled areas are known as defined at step 202 in FIG. 9. It is assumed that minimum, maximum and natural sizes in horizontal and vertical directions for the child window to be moved have been defined as at step 204 of FIG. 9.

At step 224, a test is made as to whether a tiled area exists. If not, execution proceeds to step 226 where the routine attempts to allocate a tiled area that is at least as high as the selected window. At step 230, a check is made as to whether the overlapped area, that is, the area inside the parent window that is not within the tiled area, is not too small. Note that in this discussion the overlapped area and the parent window are initially the same area. That is, before a tiled area has been created the overlapped area is the entirety of the parent window's interior.

In initially creating a tiled area, the overlapped area is considered "too small" if the child window selected for placement in the tiled area has a minimum vertical dimension that is greater than half of the vertical dimension of the parent window. An attempt is made to make the tiled area large enough to accomodate the child window's natural vertical dimension. However, if the natural vertical dimension of the tiled window requires a tiled area that is larger than one-half of the height of the parent window then a smaller vertical dimension for the selected child window, up to the selected child window's minimum dimension, is used, instead. Note that the limitation of one-half of the parent window's height is arbitrary. This size is chosen in the preferred embodiment since it provides a minimum size for the overlapped area that is equal to the maximum size for the tiled area, namely, one-half of the parent window. This limitation only applies to the automatic creation and sizing of the tiled area. The limitation can be overridden when the user manually adjusts the size of the tiled or overlapped areas as described below. Other initial limitations for the tiled area's vertical size may be used.

If, instead, at step 230 the overlapped area is determined to be too small, step 236 is executed where the tiled area is made half as large as the parent window. Note that the parent window itself may be resized by the user. The parent may be resized regardless of minimum, maximum and natural sizes for its child windows since the child window views are "clipped," in accordance with methods well known in the art, when the child window views can no longer fit within the parent window. At step 242, a check is made as to whether the selected window can fit within the tiled area when the tiled area is smaller than the height of the selected window. Such a fit is possible by shrinking the selected window, up to its minimum vertical dimension, as required. If the selected window can be made to fit inside the tiled area by shrinking it (but not below its minimum height) step 246 is then executed to place the selected window to the right inside the tiled area as before. Step 255 is executed to save the selected window's previous coordinates in the overlapped area for later restoration. The routine then exits at step 256.

If, at step 242, the selected window cannot be shrunk to fit in the allocated tiled area because the minimum height of the selected window is too large, execution proceeds to 254 where the user is informed that the selected window cannot be fitted into a tiled area.

Returning to step 224, if a tiled area already exists when routine 220 is entered, then the routine attempts to fit the selected window into the existing tiled area.

At step 228, a check is made as to whether there are any existing spaces or slots within the tiled area that are large enough to contain the selected window. Regardless of the selected window's current size, the natural size of the selected window are the dimensions used in attempting to make a fit. If both the horizontal and vertical natural dimensions of the selected window will fit into a slot in the tiled area, then step 248 is executed. If a slot is larger than the selected window's natural size in both dimensions then the window is placed into the slot in the lower left corner of the slot with the window in its natural size. At step 248, if multiple possible slots are available, then the lowermost, rightmost slot is used. At step 252, the last position of the selected window in the overlapped area, along with the selected window's size in the overlapped area, is stored. This allows the selected window to be repositioned in the overlapped area at a later time at the same place and in the same size as it existed previously. The routine is exited at step 256.

Alternatively, if the check at step 228 determines that no slots exist in the tiled area that can contain the selected window in at least the selected window's natural size, execution proceeds to step 234. At step 234 a check is made as to whether there are any slots that have one dimension greater than or equal to the selected window's corresponding natural dimension and the other dimension greater than or equal to the corresponding minimum dimension for the selected window. If so, step 232 determines whether there are multiple such windows and, if so, prioritizes the slots so that the relative proportions of length to width based on the natural dimensions for the window are maintained as closely as possible.

In other words, if the selected window has natural dimensions such that its width is substantially greater than its height (i.e., a "landscape" aspect ratio), then slots that can accommodate the window that while maintaining the relative ratio of width to height will be chosen first. On the other hand, if the window is one with an aspect where the height is substantially greater than the width (i.e., a "portrait" type window) then slots that maintain the greater height-to-width ratio will be chosen over others, accordingly. At step 248, if there are multiple slots of high priority, the largest of the multiple possible slots is chosen. If there are multiple slots of the same largest size then the lowermost and rightmost slot of the "largest size" slots is used. At step 252, as before, the coordinates of the selected window in the overlapped area are saved so that the selected window can be returned to the overlapped area in its similar form if required by the user or the computer system.

If, at step 234, no slots were found with sufficient dimensions, step 240 is executed to check whether there are any slots that have both dimensions greater than or equal to the corresponding minimum dimensions for the selected window. If so, step 232 again tries to keep proportions for the selected window roughly the same as for the selected window's natural dimensions. That is, if the selected window is naturally a landscape, slots will be chosen so that the width will be greater than the height. Similarly, if the selected window is naturally a portrait type, slots will be chosen so that the height is greater than the width when the window is displayed in the slot. Steps 248, 252 and 256 are next executed as before.

If, at step 240, there are no slots that have dimensions greater than or equal to both minimum dimensions for the selected window, step 250 is executed to check whether the tiled area is at its maximum size. In the preferred embodiment, the tiled area will only be allowed to grow to one-half the height of the parent window as discussed above. However, the user may manually extend the tiled area beyond this limitation as described below.

If the tiled area is not yet at its maximum size, an attempt is made to "grow" the tiled area to make it larger so that a selected window could be made to fit into a larger slot in the larger tiled area. Step 244 accomplishes this by incrementally extending or enlarging the tiled area upward. The details of extending the tiled area are discussed below. Execution then returns to step 228 where, as before, a check is again made for any slots that will fit the selected window according to the selected window's natural sizes. If, at step 250, the tiled area cannot be "grown" anymore, execution proceeds to step 254 where the user is informed that the selected window cannot be made to fit into the tiled area. Where the user has selected a window to move to the tiled area by using the menu command from the main menu bar or the tile button within the selected window, a message in the form of a dialogue box can alert the user that the window cannot be moved to the tiled area.

Other means for alerting the user could be employed such as a warning beep. Where the user has selected a window to move to the tiled area by clicking and dragging the window, the preferred embodiment turns the pointer into a "no entry" symbol when the user is in an area where the selected window cannot be "dropped" to fit into a slot in the tiled area.

Thus, the discussion above in connection with routine 220 of FIG. 10 illustrates how a method for placing a child window in the tiled area is implemented in a preferred embodiment of the present invention.

Expanding Windows in the Tiled Area

Figure 11:
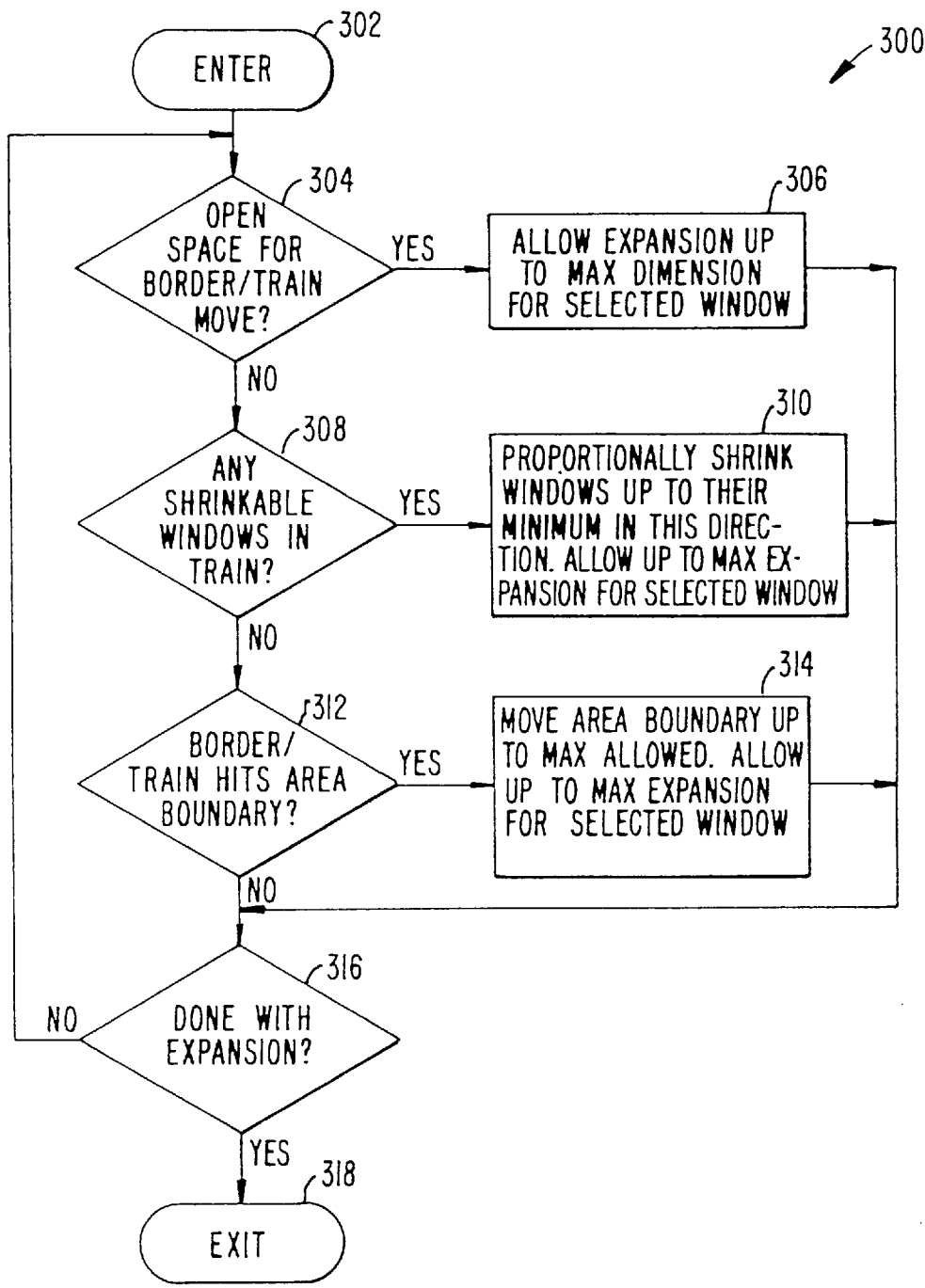
FIG. 11 is a flowchart of a routine for expanding a child window in a tiled area.

FIG. 11 is a flowchart of a routine 300 for implementing a method to expand a child window in the tiled area. As described above in connection with FIG. 8, windows in the tiled area may be expanded or shrunk by the user or by the computer system executing an application program or operating system. The user is able to expand and shrink windows in the tiled area by clicking on the window borders and simply dragging the border into or away from the window whose size the user wants to change. The problem with this is that the dragging of the border might bring the border into contact with a border of another window in the tiled area or with a boundary of the tiled area when the window is being enlarged.

The example below describes expanding a window in the horizontal dimension to the right. It will be apparent that the expansion could be to the left by analogous steps or, likewise, upward or downward in the vertical dimension.

Routine 300 is entered at step 302 where it is assumed that the user has clicked on and is attempting to enlarge a selected window by moving the border in the horizontal or vertical direction away from the selected window. Where the computer system is automatically trying to enlarge a window in the tiled area, the method for allowing the enlargement is analogous to that described here for user expansion of a window in the tiled area. At step 304 a check is made as to whether there is any open space for the border to move in the desired direction.

Figure 12A:
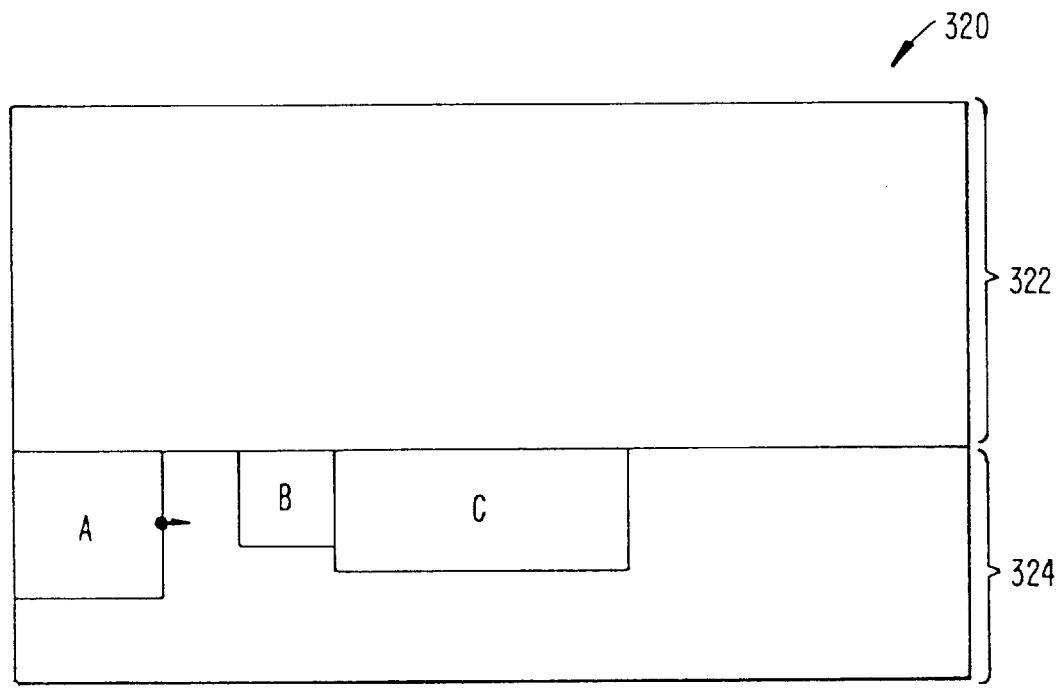
FIG. 12A is a first illustration of windows in a tiled area to show how a child window is expanded.

Referring to FIG. 12A, parent window 320 is shown having overlapped area 322 and tiled area 324. Tiled area 324 includes child windows A, B and C. Window A is a selected window and is to be expanded to the right as shown by the arrow attached to it. In this case, there is open space to the right of window A so the right-most border may be freely moved to the right thus expanding window A.

Figure 12B:
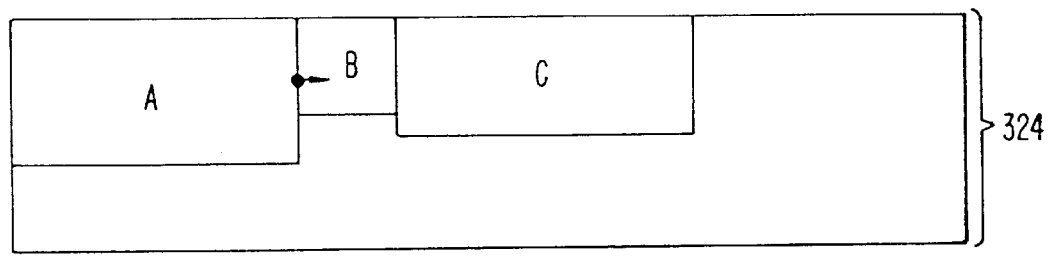
FIG. 12B is a second illustration of windows in a tiled area to show how a child window is expanded.

Referring to FIG. 11, step 306 is next executed to allow the window to expand to the right. It will be apparent that expansion in the vertical direction follows a similar procedure. By "train" it is meant that when there are contiguous windows adjacent to the moving border of the window being expanded, the group of contiguous windows, other than the selected window being expanded, is referred to as a "train". For example, in FIG. 12B in which only the tiled area 324 is shown, window A has been expanded so that its border now contacts the left border of window B. Window B's right border contacts the left border of window C. Since window A is being expanded by dragging its right-most border horizontally to the right, windows B and C now form a "train" to expanding window A. If this were the case at step 304, the check would determine that there is open space for the train to move toward the right as desired by the user. Thus, window A would continue to be expanded up to its maximum size while windows B and C are slid rightward. After executing step 306, step 316 is performed which checks whether or not the user is done with the expansion. In this case, it is assumed that steps 304–316 form a loop in which expansion of a selected window is done incrementally so that execution returns to step 304 to repeat the process if the user is still attempting to expand the selected window. The check at 316 will cause the routine to terminate if the user is done with the expansion or if the window cannot be expanded because it has reached its maximum size in this dimension. In a preferred embodiment, the size of a window is adjusted by "grabbing" a border of the window. Windows may be repositioned (without resizing) by grabbing the title bar of the window.

Figure 12C:
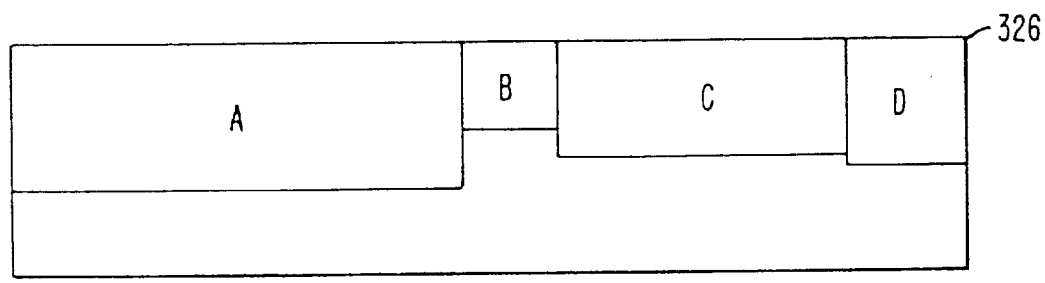
FIG. 12C is a third illustration of windows in a tiled area to show how a child window is expanded.

Returning to FIG. 11, if the check at step 304 shows that there is no space for the border/train to move, then step 308 is executed. This would be the case, as is in FIG. 12C where window D exists between window C and the right-most border of the parent window. Thus, there is no room to the right of window A to allow expansion freely into an open space.

Figure 13A:
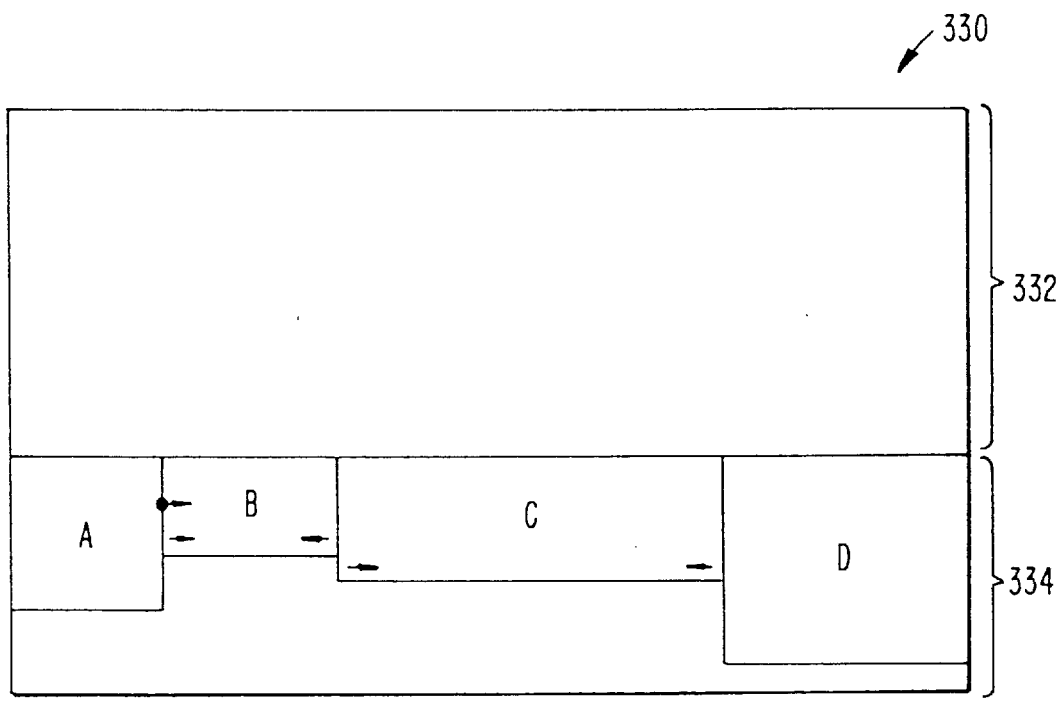
FIGS. 13A–C illustrate resizing of windows in a tile region when open space is not available.
Figure 13B:
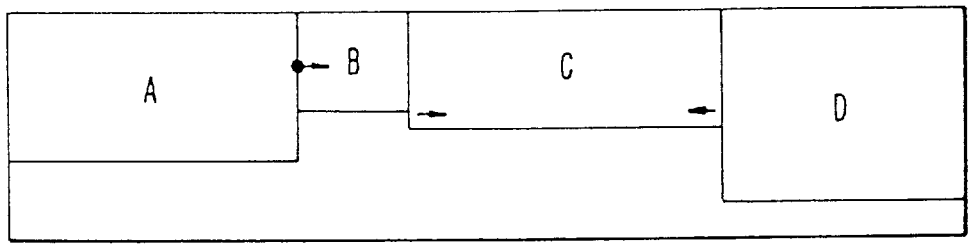

At this point, step 308 is executed to test whether there are any shrinkable windows in the train. FIG. 13A shows an illustration similar to that of FIG. 12A in that parent window 330 includes overlapped region 332 and tiled region 334. Tiled region 334 includes windows A, B, C and D. Again, it is desired to expand window A by moving the right border of window A to the right. However, since there is no open space to allow expansion of the window by moving the border or train, step 308 is executed to test whether the windows in the train are shrinkable. That is, a window in the train is shrinkable if it is not at its minimum size in the desired dimension. In this case, the desired dimension is the horizontal dimension.

Assuming both windows B and C are not at their minimum horizontal size, these windows will be shrunk proportionately up until the point that they reach their minimum width. The shrinking of windows in the train is performed at step 310. Proportional shrinking means that for every unit of expansion of A, the ratio of B's width to the width of B+C is the percentage shrink of a unit in width for window B. Similarly, for window C, the percentage shrink of the expansion of A is the ratio of C to C+B. After the windows have been shrunk by an incremental step, execution proceeds to step 316 where, as before, a test is made as to whether the expansion operation is completed.

Other methods for performing proportional or non-proportional shrinking are possible and will be readily apparent to one of skill in the art. For example, windows can shrink at different predetermined rates depending on the importance of each window, a given window could shrink in incremental steps, the information within each window can be scaled concurrently with the window's size, etc.

Figure 13C:
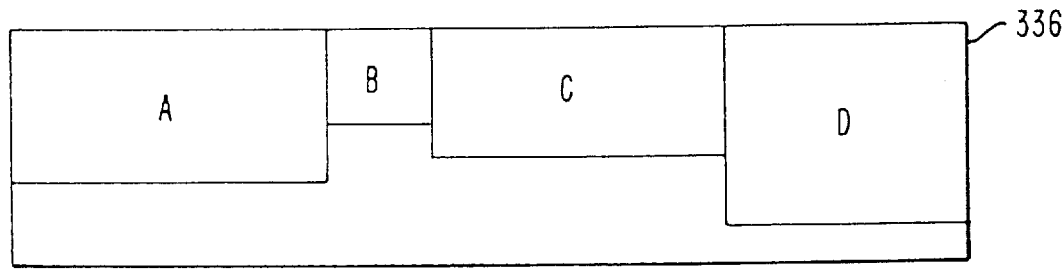

Returning to step 308, assuming, as shown in FIG. 13C, that windows B, C and D are at their minimum width then no rightward expansion for window A can take place. Step 308 detects that there are no shrinkable windows in the train B, C, D, and execution proceeds to step 312.

At step 312, a test is made as to whether the border/train is hitting an area boundary. In FIG. 13C area boundary 336 is the only area boundary that separates the overlapped area (not shown in FIG. 13C) with the tiled area. Since, in the present example, the expansion is being attempted to the right, step 312 determines that the border/train is not hitting an area boundary and execution proceeds to step 316. Since the expansion cannot be performed in the desired direction, the routine exists at step 318.

Assuming, instead, that the border/train were to hit an area boundary, as in the case of vertical rather than horizontal expansion, the area boundary is moved at step 314 in a manner described below in connection with the flowchart of FIG. 14. In other words, the tiled area can be adjusted vertically in size, but not horizontally, in response to child window resizing operations.

It should be recognized that the steps of FIG. 11, while described specifically as an iterative loop, can be implemented in a variety of ways including interrupt-driven routines that handle user input such as mouse repositioning, clicking, etc., in a more efficient manner. Further, steps may be added to or omitted from routine 300 without departing from the scope of the invention.

It should be apparent that a window in the tiled area can be easily shrunk down to its minimum size in that dimension by merely leaving the boundary opposite the border being moved fixed. As the window shrinks, it leaves open space in the portion of the tiled area that was previously covered by the window.

Thus, it has been shown in the discussion above in connection with FIGS. 11–13C that the present invention provides a method for expanding a child window in the tiled area in a flexible and efficient manner.

Changing the Size of the Tiled Area

Figure 14:
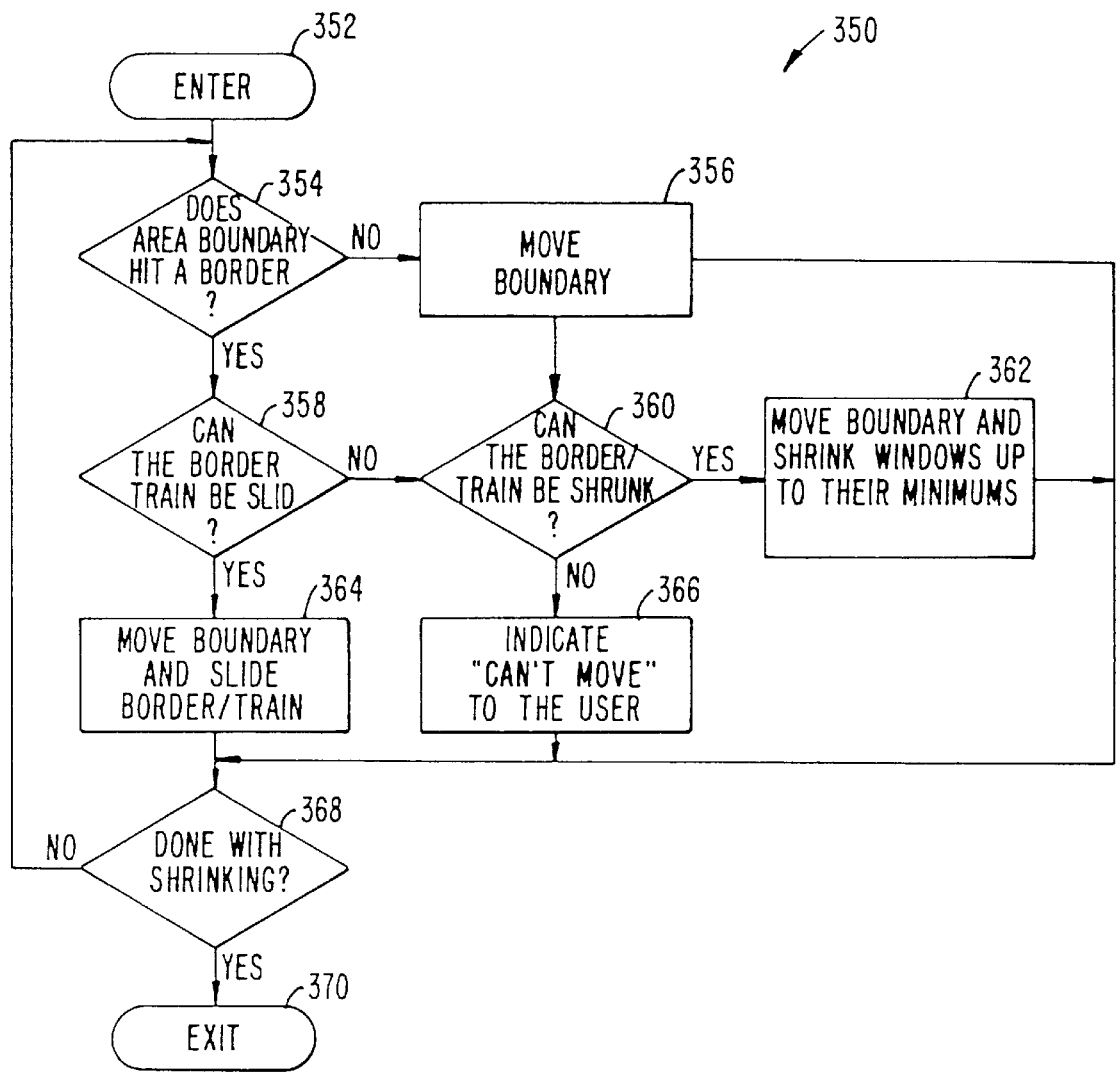
FIG. 14 shows a flowchart of a routine for shrinking a tiled area.

FIG. 14 shows a flowchart for a routine 350 that describes the steps in a method for shrinking the tiled area. The user may decide to decrease the size of the tiled area so that the overlapped area in the parent window is increased. This provides the user with flexibility in managing windows on the screen. Also, software executed by the computer such as the application program or operating system may shrink the tiled area automatically, independently of the user, for reasons of its own. In a preferred embodiment, the user is able to shrink the tiled area by grabbing the area boundary such as boundary 176 shown in FIG. 7 by using the mouse and pointer. The method described by routine 350 corresponds to step 212 of FIG. 9 as a part of the operation of resizing tiled and overlapped areas.

Figure 15A:
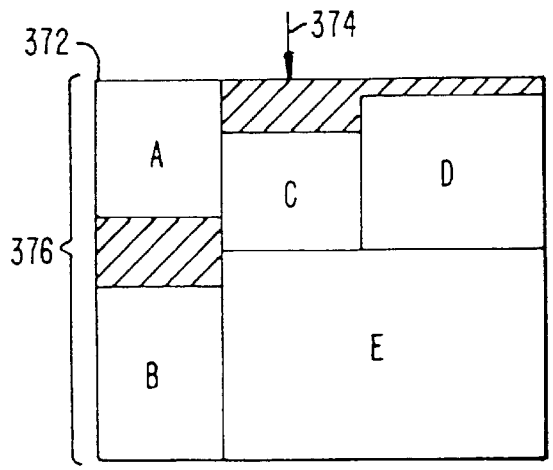
FIG. 15A is a first illustration of a boundary being moved to shrink a tiled area.
Figure 15B:
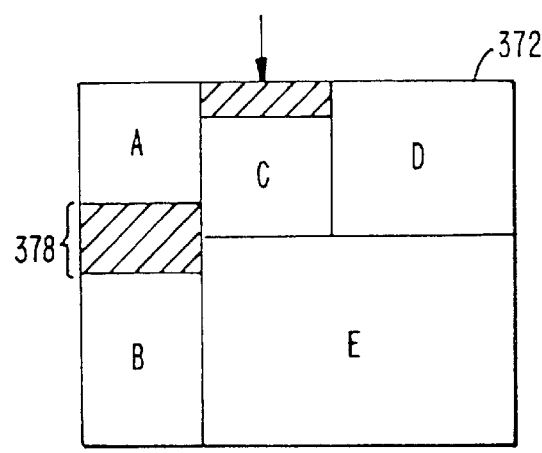
FIG. 15B is a second illustration of a boundary being moved to shrink a tiled area.
Figure 15C:
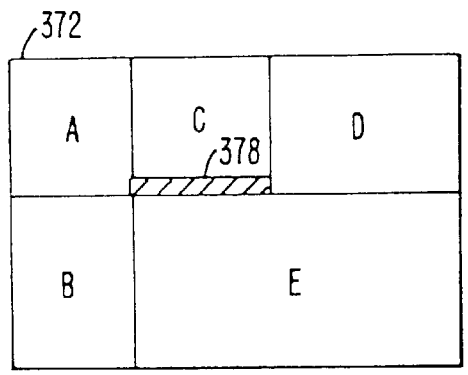
FIG. 15C is a third illustration of a boundary being moved to shrink a tiled area.

FIG. 14 shows routine 350 which is entered at step 352. It is assumed that the user or software executed by the computer system is attempting to shrink the tiled area by moving the area boundary downward in the case where the tiled area is at the bottom of the parent window. FIGS. 15A-C should also be referred to since they illustrate an example of boundary 372 being moved downward as indicated by arrow 374 in order to shrink tiled area 376. Tiled area 376 contains windows A–E.

In the example of FIG. 15A, the check at step 354 of FIG. 14 would be true and step 358 would be executed next since the top border of window A is contacting boundary 372. Assuming window A is not contacting boundary 372 at window A's upper border, execution proceeds to step 356 where the boundary is simply moved downward thus reducing open space between the border of the topmost window and boundary 372. At step 376 a test is made as to whether the shrinking operation is complete. If not, execution returns to step 354 where the loop of steps 350–368 is executed iteratively to move the boundary downward. If it is determined at step 368 that the shrinking operation is complete, routine 350 exits at step 370.

Returning to step 354, if, as shown in FIG. 15A window A is contacting border 372, then step 358 is executed to check whether the contacted border/train can be moved. If so, as is the case in FIG. 15A, the border's window or windows in the train are slid downward into open space.

FIG. 15B shows the effect of sliding border 372 downward a little bit until border 372 contacts a second window, window D. Window A has also been slid downward into the open space at 378 thus diminishing that amount of open space slightly.

Assuming the shrinking operation is not complete, execution returns to step 354. In this case execution passes from step 354 to step 358 where it is determined that the boundary can no longer be moved downward by sliding windows into open space. Thus, step 360 is executed where a test is made as to whether the border/train can be shrunk. Assuming, in the example, that window D can be shrunk, step 362 is executed where boundary 372 is allowed to move downward still further while window D is shrunk and window A is slid.

FIG. 15C shows the result after boundary 372 has been slid far enough down that each of windows A, C and D are contacted. This assumes that windows A, B, C, D and E can all be shrunk in the vertical direction, i.e., that their vertical dimension still exceeds their minimum size for height. Note that as windows are shrunk due to boundary 372 moving downward gaps such as gap 378 may form, for example, where window C shrinks to its minimum size and can shrink no more and window E begins shrinking while window C slides.

Assuming, at step 360 of FIG. 14, that the border train can no longer be shrunk, i.e., windows A and B or windows D and E of FIG. 15C have reached their minimum heights, step 366 is executed. At step 366 an indication is given to the user that the boundary can no longer be moved because of size restrictions in the tiled windows.

Thus, it has been shown that the present invention allows for shrinking of the tiled area by moving the area boundary as described in connection with FIG. 14 above.

Figure 16A:
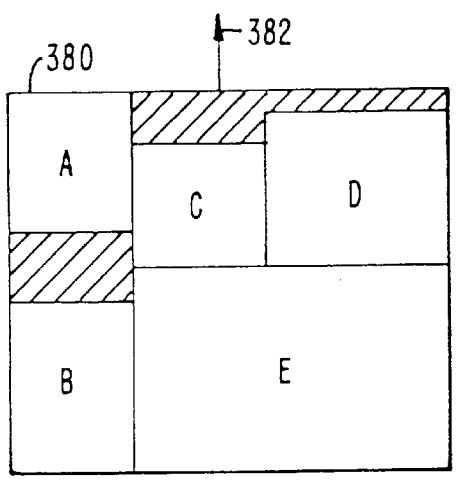
FIG. 16A is a first illustration of an area boundary being moved to enlarge a tiled area.
Figure 16B:
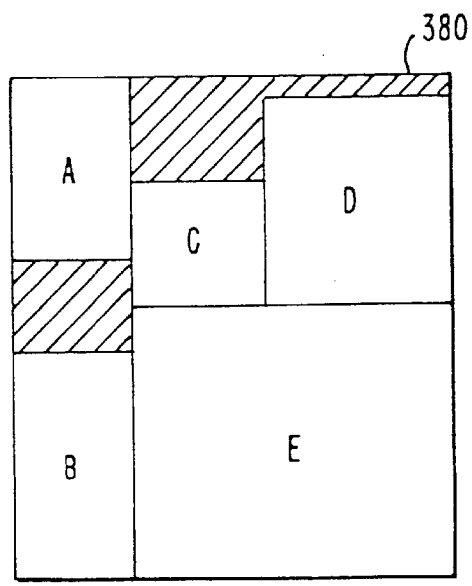
FIG. 16B is a second illustration of an area boundary being moved to enlarge a tiled area.

The tiled area can also be enlarged by moving the area boundary upward. This is shown in FIGS. 16A and 16B where boundary 380 is being moved upward as shown by the arrow 382. As boundary 380 moves up, all the windows and open space areas are made proportionately larger. If a window is bigger than its natural size in the vertical dimension, then it is not made larger. This causes other windows to grow more quickly. FIG. 16B shows boundary 380 after it has been moved up from its position in FIG. 16A. FIG. 16B shows that windows A, B, D and E have all been increased proportionately while window C, which is already at its natural height in FIG. 16A, remains unchanged. As is shown in FIG. 16B, open spaces have proportionately grown larger also.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A computer-implemented method of displaying overlapped and tiled windows on a display screen, comprising the steps of:

displaying a first window in an overlapped area on the display screen;

displaying a second window in a tiled area on the display screen while the first window is displayed in the overlapped area on the display screen; and adding a third window to one of the overlapped and tiled areas on the display screen, the first and third windows being displayed overlapped if the third window is added to the overlapped area, and the second and third windows being displayed tiled if the third window is added to the tiled area.

2. The method of claim 1, further comprising the steps of:

accepting user input to select a window in the overlapped area to move to the tiled area on the display screen; and tiling the selected window in the tiled area.

3. The method of claim 2, further comprising the step of allowing a user to drag the selected window from the overlapped area to the tiled area on the display screen.

4. The method of claim 2, further comprising the step of displaying a tile button in the selected window which causes the selected window to be moved to the tiled area when activated by the user input.

5. The method of claim 2, further comprising the step of allowing a user to access a menu to move the selected window from the tiled area to the tiled area on the display screen.

6. The method of claim 1, wherein the overlapped area includes a plurality of cascaded windows.

7. A computer-implemented method of displaying overlapped and tiled windows on a display screen, comprising the steps of:

displaying a first window in an overlapped area on the display screen;

displaying a second window in a tiled area on the display screen while the first window is displayed in the overlapped area on the display screen;

adding a third window to one of the overlapped and tiled areas on the display screen, the first and third windows being displayed overlapped if the third window is added to the overlapped area, and the second and third windows being displayed tiled if the third window is added to the tiled area; and accepting user input to move a boundary between the overlapped and tiled areas on the display screen.

8. The method of claim 7, further comprising the step of enlarging windows in the tiled area when moving the boundary increases the size of the tiled area.

9. The method of claim 8, further comprising the step of enlarging windows closer to their natural dimensions.

10. The method of claim 7, further comprising the step of reducing open space between windows in the tiled area when moving the boundary decreases the size of the tiled area.

11. The method of claim 7, further comprising the step of shrinking windows in the tiled area when moving the boundary decreases the size of the tiled area.

12. A computer-implemented method of displaying overlapped and tiled windows on a display screen, comprising the steps of:

displaying a first window in an overlapped area on the display screen;

displaying a second window in a tiled area on the display screen while the first window is displayed in the overlapped area on the display screen;

adding a third window to one of the overlapped and tiled areas on the display screen, the first and third windows being displayed overlapped if the third window is added to the overlapped area, and the second and third windows being displayed tiled if the third window is added to the tiled area; and accepting user input to move a border of a selected window in the tiled area on the display screen.

13. The method of claim 12, further comprising the step of reducing open space between windows in the tiled area when moving the border increases the size of the selected window.

14. The method of claim 12, further comprising the step of shrinking windows in the tiled area when moving the border increases the size of the selected window.

15. A computer system that displays overlapped and tiled windows, comprising:

a processor;

a user input device;

a display screen;

a computer readable medium storing a computer program comprising:

computer code that displays a first window in an overlapped area on the display screen;

computer code that displays a second window in a tiled area on the display screen while the first window is displayed in the overlapped area on the display screen; and computer code that adds a third window to one of the overlapped and tiled areas on the display screen, the first and third windows being displayed overlapped if the third window is added to the overlapped area, and the second and third windows being displayed tiled if the third window is added to the tiled area.

16. The system of claim 15, further comprising:

computer code that accepts user input to select a window in the overlapped area to move to the tiled area on the display screen; and computer code that tiles the selected window in the tiled area.

17. The system of claim 16, further comprising computer code that allows a user to drag the selected window from the overlapped area to the tiled area on the display screen.

18. The system of claim 16, further comprising computer code that displays a tile button in the selected window which causes the selected window to be moved to the tiled area when activated by the user input.

19. The system of claim 16, further comprising computer code that allows a user to access a menu to move the selected window from the tiled area to the tiled area on the display screen.

20. The system of claim 15, wherein the computer readable medium is selected from the group consisting of disk, tape or memory.

21. The system of claim 15, wherein the overlapped area includes a plurality of cascaded windows.

22. The method of claim 15, wherein the computer program is selected from the group consisting of an operating system and an application program.

23. A computer program product that displays overlapped and tiled windows on a display screen, comprising:
    computer code that allocates an overlapped area on the display screen;
    computer code that allocates a tiled area on the display screen, the display screen including the overlapped and tiled areas simultaneously;
    computer code that restricts windows in the overlapped area to being displayed overlapped and restricts windows in the tiled area to being displayed tiled; and
    a computer readable medium that stores the computer codes.

24. The computer program product of claim 23, further comprising:
    computer code that accepts user input to select a window in one of the overlapped and tiled areas; and
    computer code that moves the selected window to the other of the overlapped and tiled areas, the selected window being displayed overlapped if in the overlapped area and tiled if in the tiled area.

25. The computer program product of claim 23, wherein the computer readable medium is selected from the group consisting of disk, tape or memory.

26. The computer program product of claim 23, wherein the overlapped area includes a plurality of cascaded windows.

27. A computer-implemented method of displaying overlapped and tiled windows on a display screen, comprising the steps of:
    allocating an overlapped area on the display screen;
    allocating a tiled area on the display screen, the display screen including the overlapped and tiled areas simultaneously;
    displaying a button in a window in the overlapped area; and
    moving the window from the overlapped area to the tiled area when the button is activated by a user.

28. A computer program product that displays overlapped and tiled windows on a display screen, comprising:
    computer code that allocates an overlapped area on the display screen;
    computer code that allocates a tiled area on the display screen, the display screen including the overlapped and tiled areas simultaneously;
    computer code that displays a button in a window in the overlapped area;
    computer code that moves the window from the overlapped area to the tiled area when the button is activated by a user; and
    a computer readable medium that stores the computer codes.

29. A computer system that displays overlapped and tiled windows, comprising:
    a processor;
    a user input device;
    a display screen;
    a computer readable medium storing a computer program comprising:
        computer code that allocates an overlapped area on the display screen;
        computer code that allocates a tiled area on the display screen, the display screen including the overlapped and tiled areas simultaneously;
        computer code that displays a button in a window in the overlapped area; and
        computer code that moves the window from the overlapped area to the tiled area when the button is activated by a user.

30. A computer system that displays overlapped and tiled windows, comprising:
    a processor;
    a user input device;
    a display screen;
    a computer readable medium storing a computer program comprising:
        computer code that allocates an overlapped area on the display screen;
        computer code that allocates a tiled area on the display screen, the display screen including the overlapped and tiled areas simultaneously;
        computer code that displays a button in a window in the overlapped area;
        computer code that moves the window from the overlapped area to the tiled area when the button is activated by a user; and
        computer code that accepts user input to move a boundary between the overlapped and tiled areas on the display screen.

31. The system of claim 30, further comprising computer code that enlarges widows in the tiled area when moving the boundary increases the size of the tiled area.

32. The system of claim 31, further comprising computer code that enlarges widows closer to their natural dimensions.

33. The system of claim 30, further comprising computer code that reduces open space between windows in the tiled area when moving the boundary decreases the size of the tiled area.

34. The system of claim 30, further comprising computer code that shrinks windows in the tiled area when moving the boundary decreases the size of the tiled area.

35. A computer system that displays overlapped and tiled windows,
    a processor;
    a user input device;
    a display screen;

a computer readable medium storing a computer program comprising:
- computer code that allocates an overlapped area on the display screen;
- computer code that allocates a tiled area on the display screen, the display screen including the overlapped and tiled areas simultaneously;
- computer code that displays a button in a window in the overlapped area;
- computer code that moves the window from the overlapped area to the tiled area when the button is activated by a user; and
- computer code that accepts user input to move a border of a selected window in the tiled area on the display screen.

36. The system of claim 35, further comprising computer code that reduces open space between windows in the tiled area when moving the border increases the size of the selected window.

37. The system of claim 35, further comprising computer code that shrinks windows in the tiled area when moving the border increases the size of the selected window.

* * * * *

UNITED STATES PATENT AND TRADEMARK OFFICE
CERTIFICATE OF CORRECTION

PATENT NO. : 5,880,725
DATED : March 9, 1999
INVENTOR(S) : Sourthgate

It is certified that error appears in the above-identified patent and that said Letters Patent is hereby corrected as shown below:

On the cover page, Item [*], --Notice: The term of this patent shall not extend beyond the expiration date of Pat. No. 5,561,757--."

Signed and Sealed this

Twentieth Day of July, 1999

Attest:

Q. TODD DICKINSON

Attesting Officer

Acting Commissioner of Patents and Trademarks